Dec. 31, 1940.  E. L. SHAW  2,227,326
JOINT OF WOOD OR THE LIKE
Filed June 9, 1938
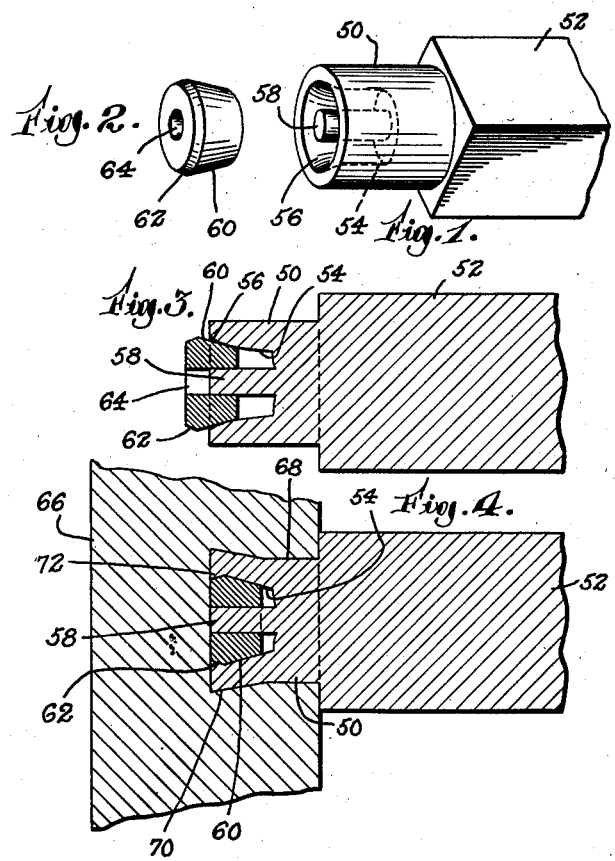
Inventor
E. L. SHAW
by Kenway & Witter
Attorneys Patented Dec. 31, 1940

2,227,326

UNITED STATES PATENT OFFICE 2,227,326

JOINT OF WOOD OR THE LIKE

Edward L. Shaw, Brookline, Mass., assignor to Shawlock, Inc., Boston, Mass., a corporation of Massachusetts Application June 9, 1938, Serial No. 212,628

2 Claims. (Cl. 20—92)

This invention relates to joints of wood or the like and more particularly to improvements therein for securing two members in such close, tight and permanent engagement that they will thereafter remain permanently as one piece without separating movement or looseness. The invention is applicable to various forms and uses including doweling, tenoning, etc., in furniture manufacture, floor laying, boat building and the like. In my Patent No. 2,168,176, dated August 1, 1939, is disclosed a tool for boring a hole preferably cylindrical adjacent to its mouth and flaring outwardly toward its bottom end, and one object of my present invention is the production of means particularly adapted for use with such tapering hole for joining together two pieces of wood or the like.

In accordance with the preferred form of my invention, a joining or doweling member in the nature of a dowel, tenon, or the like has one end portion shaped to pass into said hole and fit the cylindrical portion thereof. This end is also provided with an open bore therein and received within the bore is a plug having a conical portion engaging within the bore and serving to spread the bored end of the member into contact with the flaring walls of the hole when the member is driven into the hole. The joining member is thus anchored securely within the hole and will remain so anchored as long as the plug remains immovable within the bore. Such immovability of the plug is assured by further novel features of my invention providing co-engaging surfaces between the plug and the joining member, and hereinafter more specifically described, for securely and permanently holding the plug within the bore.

My novel joining means is adaptable to use in various forms where tenoning or doweling is required, as, for example, providing tenon joints in furniture making, providing dowels for securing two pieces together when an open hole is bored thereinto, providing double-ended dowels for securing two pieces together by engagement in a blind hole extending into both pieces, etc. The primary object of the invention is to provide such an improved joint and doweling or tenoning means for effecting the same.

These and other features of the invention will be best understood and appreciated from the following description of preferred embodiments thereof, selected for purposes of illustration and shown in the accompanying drawing wherein:

Fig. 1 is a perspective view of a tenon member showing the application of my invention thereto.

Fig. 2 is a perspective view of a plug for use therewith.

Fig. 3 is a view in longitudinal section showing the tenon member and plug combined.

Fig. 4 is a sectional view of a joint produced by this tenon member and plug.

In the drawing I have illustrated the application of my invention to the forming of a tenon joint as in furniture making. In this form of the invention a tenon 50 is turned on the end of a tenon member 52, the tenon being cylindrical and having a bore within its end with a substantially cylindrical bottom wall portion 54 and flaring outwardly at its mouth 56. Also formed integrally with the member and projecting outwardly into the bore and centrally thereof is a cylindrical post 58. Cooperating with the bore and post is a plug having a conical portion 60 for engaging the walls 56, a reversely tapered outer portion or shoulder 62, and a cylindrical hole 64 centrally therethrough. The post 58 and the hole 64 are of such relative size that the plug and tenon are held frictionally in the assembled relation illustrated in Fig. 3.

In Fig. 4 I have illustrated the tenon member 52 as joined to a socket piece 66. A socket is bored into the piece 66 having an outer cylindrical portion 68 adapted to closely fit the tenon 50 and a bottom portion 70 having the side walls flaring outwardly toward the bottom. When the tenon is driven into the socket to the position illustrated in Fig. 12, the plug is forced into the bore 54—56 thereby crowding the tenon outwardly into tight contact with the flaring side walls 70 of the socket. As illustrated, the plug is held in position by the frictional engagement of the plug on the post 58 and by engagement of the end 72 of the tenon with the annular shoulder 62 on the plug. It should be particularly noted that the post 58 serves as a guide for the plug and by making the post and hole 64 of such relative sizes as to provide a substantial frictional fit the shoulder 62 on the plug may be entirely eliminated.

It will be noted that a substantially solid portion of the dowel or tenon is provided at the abutting faces of the two pieces joined together whereby affording substantial strength against shearing or crushing action. It will be furthermore noted that the spreader plug comprises a relatively long forward portion 60 tapering in one direction and a relatively short and reversely tapering rearward portion 62 which portions are directly adjacent to each other and form at their junction an annular V-anvil over which the outer end of the doweling member is adapted to be bent into wedging contact with the reversely tapered portion when the member and plug are driven into assembled relation within a socket. It will be apparent that this relatively sharp anvil serves very efficiently to bring a substantial portion of the free end of the dowel into tight holding engagement with the outer end of the plug. I desire furthermore to call particular attention to the fact that my invention relates to the joining or doweling together of two pieces and that such terms as "doweling," "tenoning," and the like are used throughout this specification in the broad sense of joining together two members by the novel means disclosed herein.

Having thus described my invention, what I claim as new and desire to secure by Letters Patent of the United States is:

1. A doweling member having one end projecting outwardly from the member and adapted to be received within a socket of another member, said one end having a preformed round and open bore therein, a cylindrical post integral with said member at the bottom of the bore and projecting therefrom outwardly into the bore, and a plug for cooperating with the bore and having its exterior tapered outwardly-rearwardly and having a hole therethrough of a size to receive and engage said post with a frictional fit when the plug is driven into the bore, the plug being of greater diameter than the bore whereby to spread said end of the member into tight contact with the socket walls when the plug is driven into the bore.

2. A doweling assembly comprising a doweling member having one end projecting outwardly from the member and adapted to be received within a socket of another member, said one end having a preformed open bore therein with its wall tapering outwardly conically toward and adjacent to the mouth of the bore, a cylindrical post integral with said member at the bottom of the bore and projecting therefrom outwardly into the bore, and a plug extending only partially into the bore and having a hole therein in frictional engagement on the post and an exterior tapering portion arranged to cooperate with the tapering wall of the bore, the co-engagement of the post with the plug serving to hold the plug and member is assembled relation and the plug being of greater diameter than the bore whereby to spread said end of the member into tight contact with the walls of the socket when the plug is driven into the bore.

EDWARD L. SHAW.